Dec. 11, 1928.
G. F. MATTESON
1,695,255
WIREWORKING MACHINE
Filed Dec. 10, 1926  6 Sheets-Sheet 1
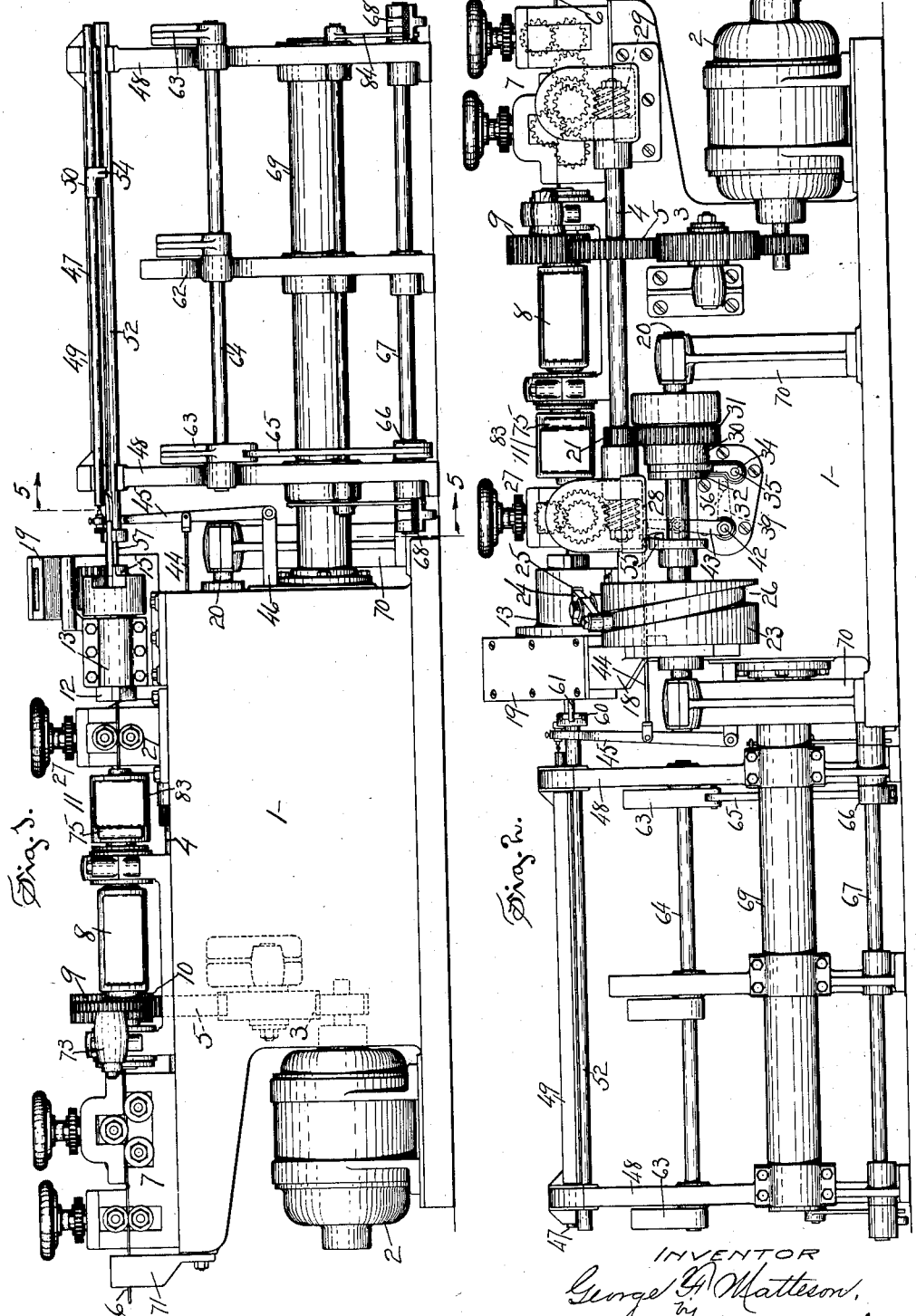
INVENTOR
George F. Matteson,
by Arthur B. Jenkins,
ATTORNEY Dec. 11, 1928.
G. F. MATTESON
1,695,255
WIREWORKING MACHINE
Filed Dec. 10, 1926   6 Sheets-Sheet 2
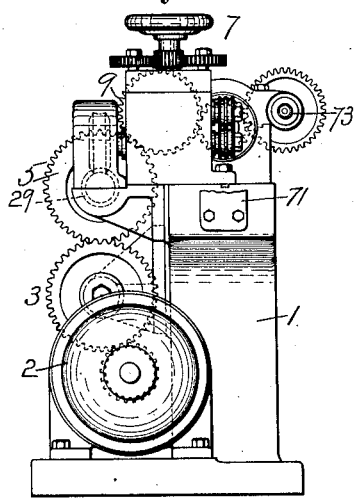
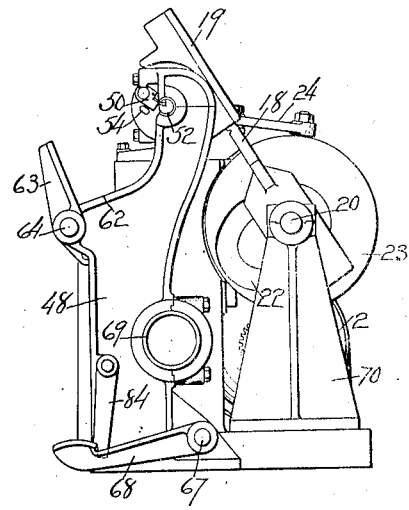
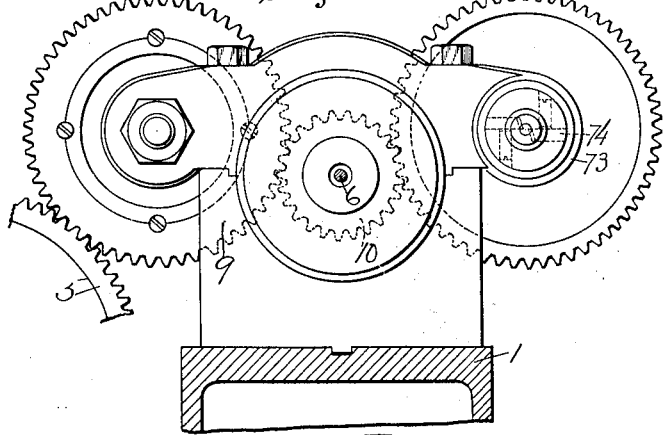
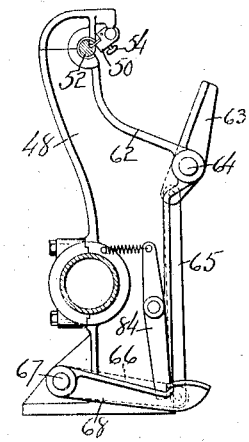
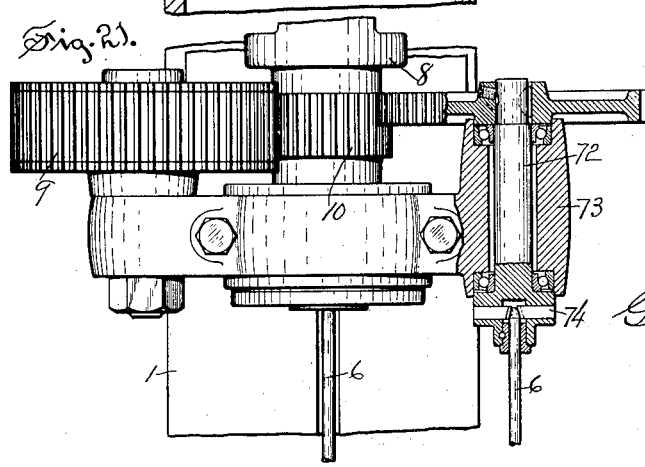
INVENTOR
George F. Matteson,
by
Arthur B. Jenkins,
ATTORNEY

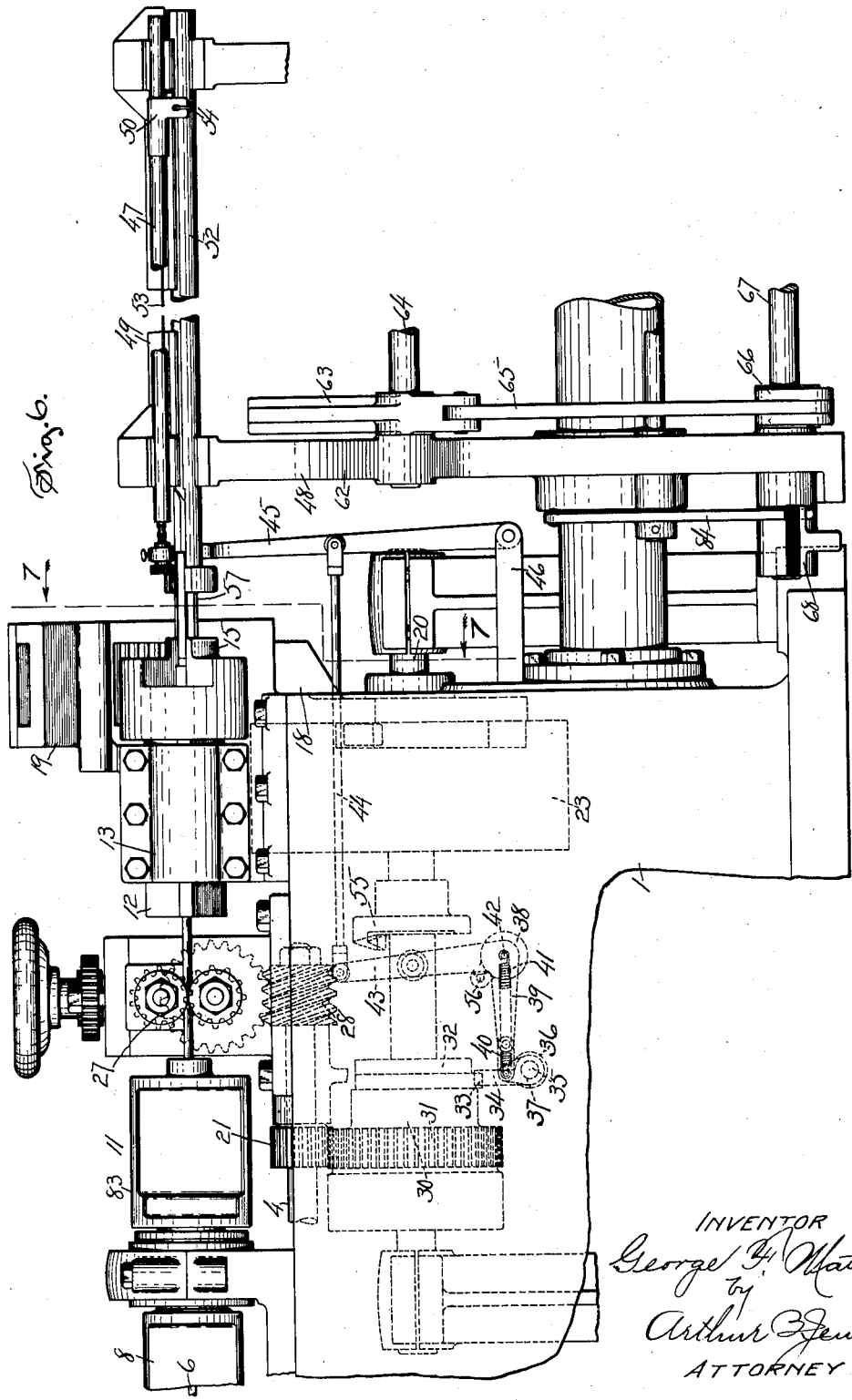

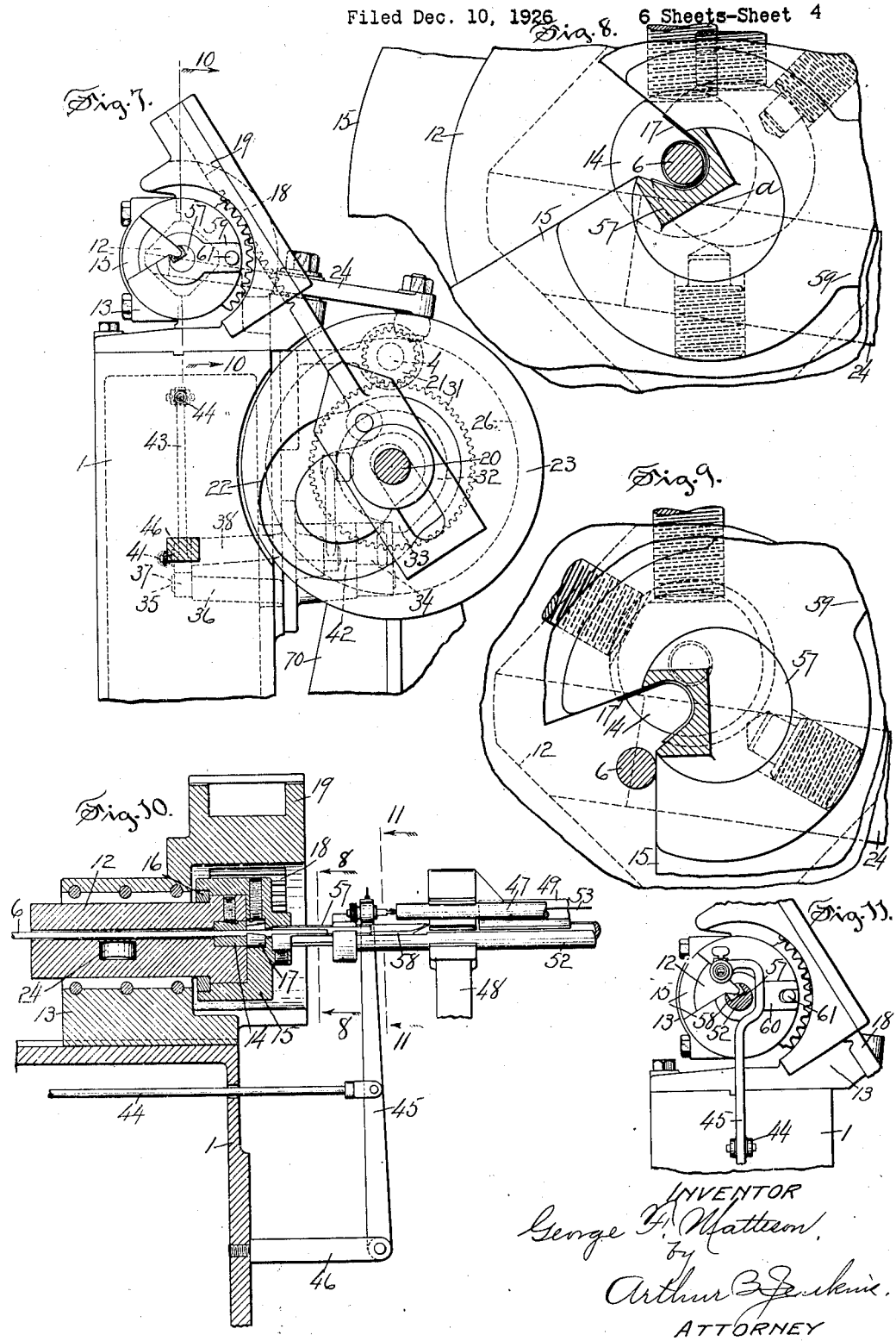

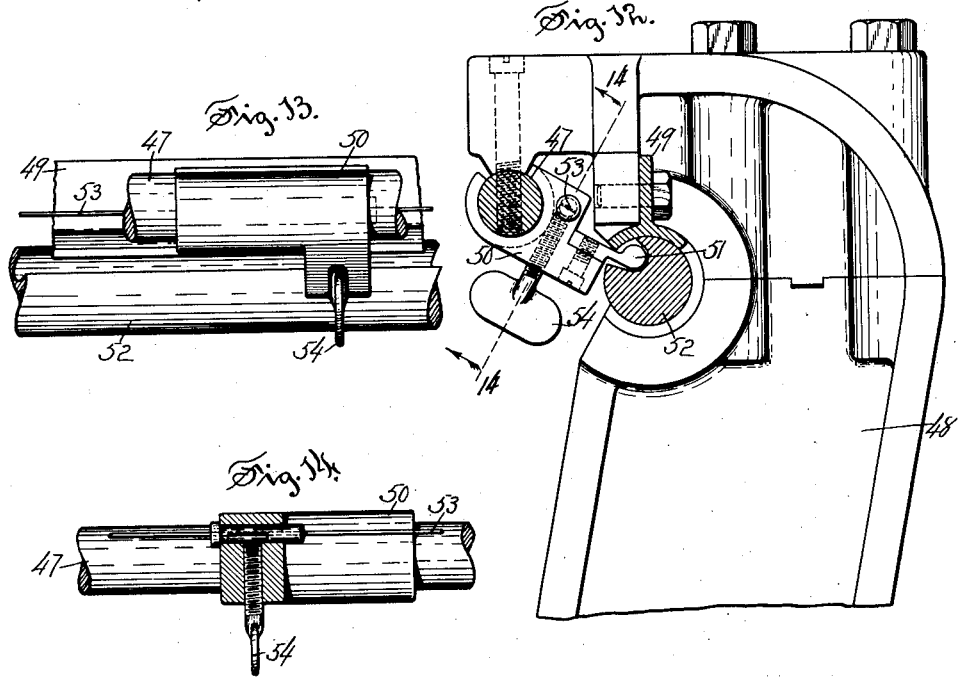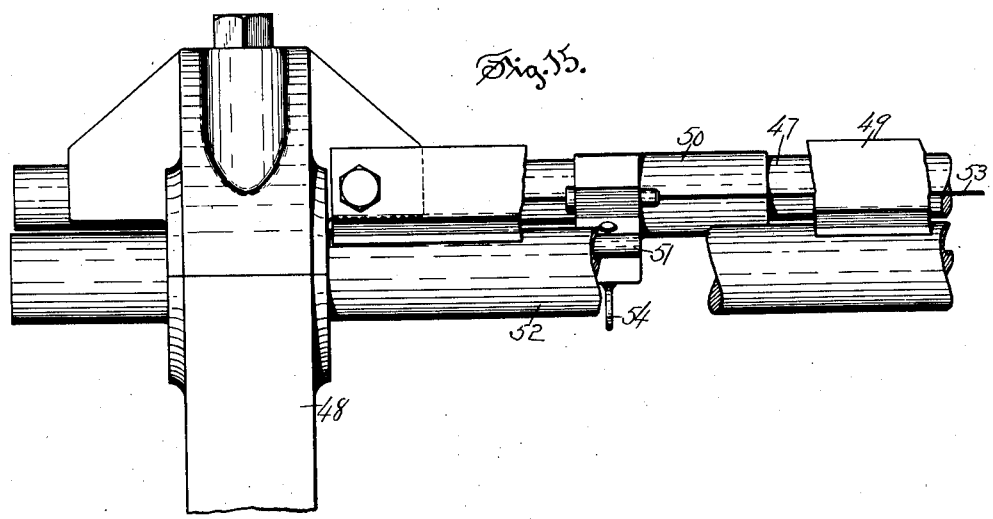

Dec. 11, 1928.
G. F. MATTESON
1,695,255
WIREWORKING MACHINE
Filed Dec. 10, 1926   6 Sheets-Sheet 6
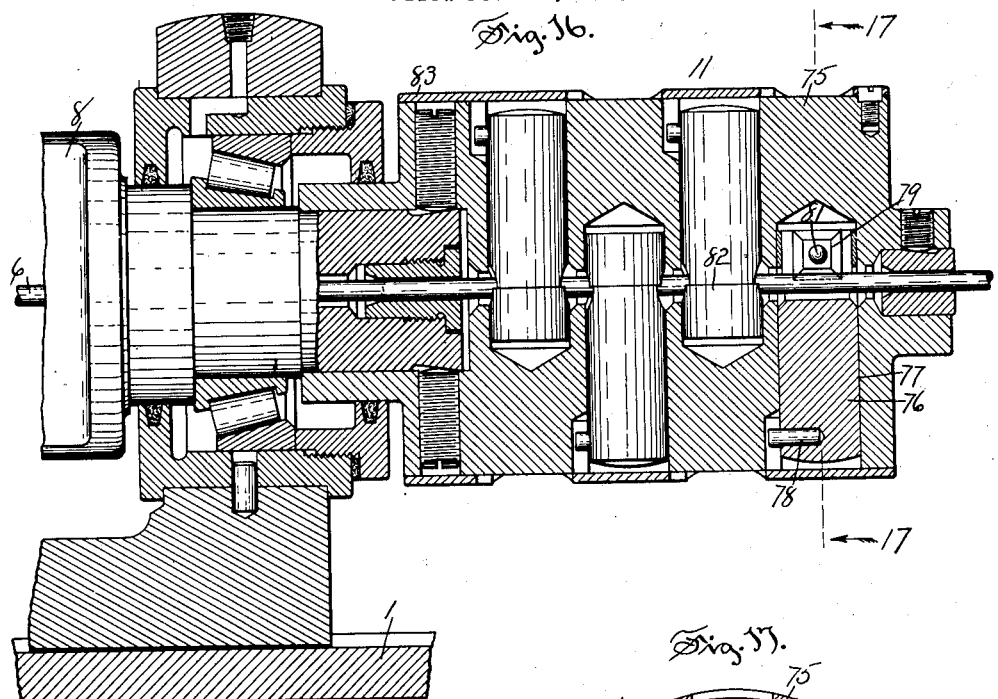
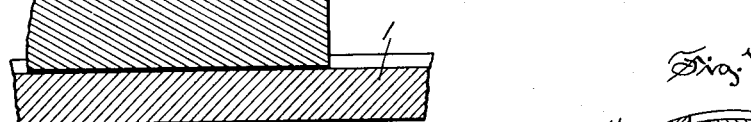
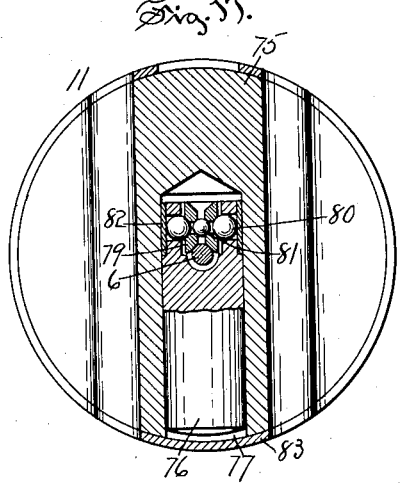
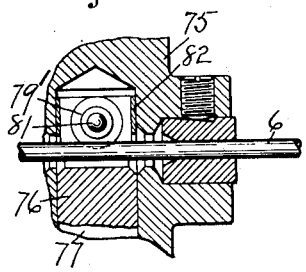
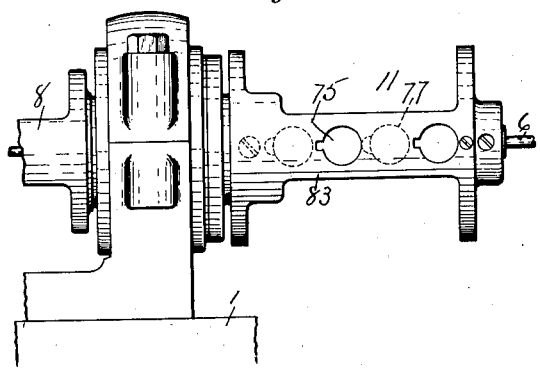
INVENTOR
George F. Matteson,
By
Arthur B. Jenkins,
ATTORNEY Patented Dec. 11, 1928.

1,695,255

UNITED STATES PATENT OFFICE.

GEORGE F. MATTESON, OF ROCKYHILL, CONNECTICUT, ASSIGNOR TO THE F. B. SHUSTER COMPANY, OF NEW HAVEN, CONNECTICUT, A CORPORATION OF CONNECTICUT.

WIREWORKING MACHINE.

Application filed December 10, 1926. Serial No. 153,856.

My invention relates to the class of machines that are employed for performing operations upon wire, and more especially for straightening and for cutting wire into definite lengths, and an object of my invention, among others, is the production of a machine of this class that shall be simple in construction and particularly efficient in operation.

One form of machine embodying my invention and in the construction and use of which the objects herein set out as well as others, may be attained, is illustrated in the accompanying drawings, in which—

Figure 1 is a view in side elevation of a machine embodying my invention.

Figure 2 is a similar view looking at the opposite side of the machine from that shown in Figure 1.

Figure 3 is a view in end elevation of the machine.

Figure 4 is a similar view looking at the opposite end of the machine from that shown in Figure 3.

Figure 5 is a view in section on a plane denoted by the dotted line 5—5 of Figure 1.

Figure 6 is a view, scale enlarged, in side elevation of a portion of the machine illustrating the construction and operation of the cutter mechanism.

Figure 7 is a detail sectional view, scale enlarged, on a plane denoted by the dotted line 7—7 of Figure 6.

Figure 8 is a view, scale still further enlarged, of a portion of the mechanism on a plane denoted by the dotted line 8—8 of Figure 10.

Figure 9 is a view similar to Figure 8, but showing the parts in a different position.

Figure 10 is a view in central lengthwise section through the cutter mechanism on a plane denoted by the dotted line 10—10 of Figure 7.

Figure 11 is a view in cross section on a plane denoted by the dotted line 11—11 of Figure 10.

Figure 12 is a view in cross section, scale enlarged, through the receiving trough and illustrating the operation of the trip mechanism.

Figure 13 is view of a portion of the mechanism shown in Figure 12 and looking from the left thereof.

Figure 14 is a view in section on a plane denoted by the dotted line 14—14 of Figure 12.

Figure 15 is a view in elevation of the device shown in Figure 12, looking from the right, and with parts broken away to show construction.

Figure 16 is a view partially in lengthwise central section through the burnisher.

Figure 17 is a view in cross section on a plane denoted by the dotted line 17—17 of Figure 16.

Figure 18 is a view in side elevation of the burnisher.

Figure 19 is a view illustrating a slightly modified form of the burnisher.

Figure 20 (Sheet II) is a view in cross section through a portion of the machine and illustrating the construction and operation of the device for shaping the end of a wire.

Figure 21 (Sheet II) is a top view of said shaping mechanism with means for operating it, said mechanism being cut in lengthwise section.

In the accompanying drawings the numeral 1 indicates generally a supporting frame for the straightening mechanism that may be driven as by means of a motor 2 supported on the frame and connected as by means of a train of gears 3 (see dotted lines in Figure 1) with a driving shaft 4 that has a gear 5, constituting one of said train, secured to it.

A wire 6 is passed by means of a feed mechanism generally denoted by the numeral 7 to a straightener 8 in a manner common to machines of this class and for which reason a further and more detailed description is omitted herein, except to state that said straightener is driven from the gear 5 by a gear 9 in mesh with a pinion 10 secured to the straightener arbor.

From the straightener 8 the wire is fed to a burnisher 11, to be hereinafter referred to, and more specifically described, and from the burnisher the wire is passed to the cutting off mechanism. This mechanism is supported on the frame 1 and includes a cutter head 12 mounted for sliding movement in a bearing 13 substantially constituting a cutter frame. This head is held against rotary movement and it has a closed cutting die 14 secured in a recess in its end. A shearing die carrier 15 is rotatably mounted on an enlarged end of the head 12, this carrier being in the form of a housing having a chamber within which said head is located, and which housing is secured to said head as by means of a threaded ring 16 seated against said head and engaging a screw thread formed on the wall of said chamber. A shearing die 17 is secured in a recess in the bottom of said chamber, this die being open on one side, as shown in Figures 8, 9 and 10, in fact, the carrier 15 having an opening from its outer surface to its center to register with the opening in the shearing die. The carrier 15 rotates on an axis $a$ thereby swinging the shearing die 17 around its axis in a manner to produce somewhat of a drawing cut of its cutting edge across the wire 6. A toothed segment is formed on the side of the carrier 15 and is engaged by the teeth of a cutter operating bar 18 mounted at one end for sliding movement in a guide 19 comprising a part of the frame including the bearing 13 hereinbefore mentioned, the toothed portion or rack of this bar being of considerable width to permit the necessary sliding movement of the carrier 15 for a purpose to be hereinafter described. The end of the bar 18 opposite said rack has a slot through which a cam shaft 20 extends, said cam shaft being driven by means of a gear thereon meshing with a pinion 21 on the driving shaft 4. This end of said bar has a roller located in a cutter operating groove 22 in a cutter operating cam 23 secured to the cam shaft 20, and as shown in Figures 6 and 7. A cutter sliding lever 24 is pivotally mounted on a boss on the back of the frame 13, one end of said lever extending through an opening 25 in the bearing or frame 13, and into a hole in the side of the cutter head 12, and as shown in Figures 2 and 10 of the drawings. The end of the lever 24 opposite the cutter head is provided with a roller located in a cutter sliding groove 26, said cam and lever operating to impart sliding movement to the cutters at a rate of speed substantially that of the wire 6 as the latter is fed through the machine by feeding devices hereinbefore referred to and also by a feed device generally indicated by the numeral 27 driven by means of intermeshing gears and pinions from the feed operating worm 28 at one end of the driving shaft 4, and as shown in Figure 6, it being here observed that the feeding mechanism 7 is also driven by means of intermeshing pinions and gears from a feed operating worm 29 on the opposite end of said shaft.

The cam shaft 20 is intermittently driven as by means of a clutch comprising a driving member 30 having a gear 31 in mesh with the pinion 21, said clutch also including a driven clutch member 32 secured to the shaft 20, the means for connecting and disconnecting the clutch driving and driven members being of a construction well known to those skilled in the art and for which reason a detailed illustration and description are omitted herein, it being sufficient to state that the driven member 32 has a nose 33 adapted to engage a stop lever 34 secured to one end of a stop lever actuating shaft 35 rotatably mounted in a boss 36 projecting from the side of the frame 1, the opposite end of said lever having an arm 37 secured thereto and projecting therefrom. A bell crank lever is rotatably mounted in a boss 38 projecting from the frame 1 inside thereof, one arm 39 of this lever being connected by a link 40, comprising a toggle connection, with the arm 37. An accelerating spring 41 is secured at one end to the outer end of the arm 37 and at its opposite end to the end of the shaft 42 of the bell crank lever. An arm 43 of the bell crank lever is secured at one end of the shaft 42 and is attached at its opposite end to an end of a clutch actuating rod 44, the opposite end of said rod being attached to a clutch actuating lever 45 pivotally secured at its lower end to a supporting arm 46 projecting from an end of the frame 1, and as shown in Figure 6 of the drawing.

A trip device comprises a trip supporting bar 47 secured to overhanging parts of standards 48 comprised in a wire receiving frame that also includes a tie bar 49 rigidly connecting the standards 48 at their upper ends, and as shown in Figures 1, 6, 12 and 15 of the drawings. A trip block 50 is mounted for sliding movement on the bar 47 and has a trip 51 projecting from its lower end into a groove extending lengthwise in a wire supporting bar 52 constituting a trough and secured to the standards 48. A trip connector 53, herein shown in the form of a wire, extends thru a hole in the block 50 in which it is clamped, as by means of a clamp screw 54, the opposite end of said connector being secured to the clutch actuating lever 45. The trip 51 is located in the path of movement of the end of a wire along the groove in the bar or trough 52 and by which wire the trip is moved to actuate the lever 45, thereby operating the bell crank lever including the arms 43 and 39 to disengage the stop lever 34 from the nose 33 of the clutch member 32. In this operation, as soon as the link 40 is raised from its "dead center" position the pull of the spring 41 will snap the stop lever 34 from engagement with the nose 33, thus completing the movement started by the trip and permitting the clutch members to engage to rotate the shaft 20 and set the cutting mechanism in operation both as to sliding and cutting movement.

A resetting cam 55 is secured to the shaft 20 and is formed to impart timely movement to the arm 43 of the bell crank lever by engagement of said cam with a roller on said lever and to move the arm 39 to straighten the link 40, thereby again disengaging the clutch members and stopping the operation of the shaft 20 and thereby of the cutter mechanism. The end of the wire being straightened is cut off at each cycle of operation of the machine which includes a complete rotation of the shaft 20, the period of time of which cycle is determined by the length of the wire to be cut. When a wire has been projected along the groove in the bar 52 nearly to the extent desired the trip 51 will be operated thereby to start the cutting mechanism which will, when started, move with the wire and at the same time sever the end thereof. The cam 55 will thereupon operate to reset the clutch actuating mechanism and the operation of the cutting mechanism will cease until another length of wire has been projected sufficiently to set the cutting mechanism in operation as just described.

A stop pin 56 is secured to and projects from the boss 38 in position to limit movement of the arm 43 with the link 40 in its straightened position, and as shown in Figure 6.

In order to effect sliding movement of the cutting mechanism without imparting a like movement to the bar 52, a bridge 57 is secured in a recess in the end of the carrier 15, and as shown in Figure 10, the opposite end of said bridge projecting into an enlarged recess 58 in the end of the bar 52, in which recess the bridge has a sliding movement. In order to effect simultaneous rotation of the carrier 15 and the wire supporting bar or trough 52 for a purpose to be hereinafter described, ears 59—60 are formed on and extend laterally from said carrier and the enlarged end of the bar respectively, one of said ears having a pin 61 secured thereto and projecting into a slot in the other ear, and as shown in Figures 7 and 11.

When the wire to be cut is projected through the cutting dies it is received in the groove in the trough 52 and as the carrier 15 is rotated to operate the cutters to sever an end of the wire the trough 52 is simultaneously rotated, as hereinbefore mentioned, from the position shown in Figure 8 to the position shown in Figure 9, in which latter position said trough opens in a direction to permit the severed end of the wire 6 to fall out of the groove and be received on wire supporting rests 62 formed in the edges of the standards 48 and against wire holding and releasing jaws 63, as shown in Figures 4 and 5. These jaws are secured to a releasing shaft 64 rotatably mounted in the standards 48, the projecting end of one of the jaws being connected by a wire releasing rod 65 to an arm 66 on a treadle shaft 67 having treadles 68 secured to opposite ends thereof for operation at either of these points, said shafts being rotatably mounted in the standards 48.

The wire receiving frame hereinbefore referred to includes the standards 48 and also a tie bar or tube 69 for securing the standards together and also for securing the wire receiving frame to the main supporting frame 1. It is here mentioned that the cam shaft 20 is mounted in standards 70 secured to and rising from the base of the main frame 1.

A lubricating device is located to receive and lubricate the wire before its engagement with the feeding mechanism 7. This device may be of any suitable form of construction sufficient for the purpose required and it includes a tank 71 in which the lubricant may be contained and which tank may also contain a felt or similar substance through which the wire passes and operating to take up the lubricant as by capillary attraction.

As a means for enabling the ready insertion of the end of a wire into the end of the straightener 8 I provide means for tapering said end so that it will readily find its way between the different dies of said straightener which is of ordinary construction and well known to those skilled in the art. This tapering device or sharpener, as shown in Figure 21, includes an arbor 72 mounted in a bearing 73 formed on the side of the cap for the bearing at one end of the straightener 8. This arbor has sharpeners 74 projecting laterally in opposite directions into an opening in the end of the sharpener to engage the end of the wire 6 that is thrust into the opening and which may be held from turning movement, as by means of pliers with which wire workers are commonly supplied, especially in the operation of straightening machines. The arbor 72 is driven by means of a gear thereon meshing with the pinion of the straightening arbor, and as shown in Figures 20 and 21.

The burnisher 11 comprises a burnishing frame 75 rotatably mounted and having a driving connection with the shaft of the straightener 8, and as shown in Figure 16. This frame 75 contains a number of burnisher supports 76 having a limited freedom of lengthwise movement in recesses 77 extending radially into the frame 75, said movement being limited as by means of pins 78 projecting from the sides of the supports and into grooves in the walls of said recesses. Lateral openings with beveled mouths extend into the recesses 77 and by means of which the wire 6 is guided through the supports 76 and between the burnishers 79. The ends of the supports 76 are forked, as shown in Figure 17, and a pair of burnishers 79 is located in each of the notches formed by said forks. Holes are formed laterally in said forks and balls 80 are located in said holes and extend partly into holes in the center of the burnisher and as shown in Figure 17. Balls 81 are also partially located in said holes in the burnishers and to an extent to space the members of each pair of burnishers apart. A sleeve 82 surrounds the reduced lower end of each of the supports 76 to retain the balls 80, and hence the burnishers 79, loosely in position and with a yielding force depending upon the centrifugal action against the wire 6.

It will thus be seen that the burnishers are free to float and thereby accommodate themselves readily to various conditions caused by the travel of the wire through the burnishers. The burnisher supports 76 are held in place by a retainer 83 rotatably mounted on the frame 75 and having openings adapted to register with the recesses 77 and through which openings the supports may be removed.

In releasing the wires from the releasing jaws 63 the foot of the operator is placed upon the treadle 68 and the ball of the foot is pressed against a pivotally mounted latch 84 that has a shoulder to overlie the treadle and prevent said treadle from moving upwardly by reason of the weight upon the releasing jaws 63. When the latch is released said weight will tend to throw the jaws 63 downwardly and a sudden movement of the jaws is prevented by pressure of the foot of the operator upon the treadles. There is a latch 84 appurtenant to each treadle.

The modified form of burnisher shown in Fig. 19 is very similar to that shown in Figs. 16 and 17 with the exception that the burnisher 79' is round instead of square as shown in said Figs. 16 and 17.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A straightening machine for movable lengths of material and including a material straightening device, a pinion for rotating said device, and a sharpening device having a gear in mesh with said pinion, said sharpening device being located in proximity to the mouth of said straightening device and having means for sharpening the end of a length of stock.

2. A straightening machine for movable lengths of material and including a material straightening device rotatably mounted, a burnishing device located in line with said straightening device and having a journal rotatably connected with the journal of said straightening device, a cutting device located in line with said burnishing device, and a feed device located between said burnishing device and said cutting device to feed the wire from the former to the latter.

3. A machine for working upon movable lengths of material and including means for feeding a length of material, a slidably mounted member, a cutting die secured thereto, a die carrier rotatably supported by said member, means for rotating said carrier, and means for imparting sliding movement to said member.

4. A machine for working upon movable lengths of material and including means for feeding a length of material, a slidably mounted cutter head having an opening within which to receive a length of material, a cutting die secured to said head and having an opening for said material, a die carrier rotatably mounted on said head, means for rotating said carrier, and means for imparting sliding movement to said head.

5. A machine for working upon movable lengths of material and including means for feeding a length of material, a slidably mounted member, a cutting die secured thereto, a die carrier rotatably mounted on said member and having a toothed surface, a cutting die secured to said carrier, a rack engaged with said toothed surface, means for reciprocating said rack, and means for imparting sliding movement to said member.

6. A machine for working upon movable lengths of material and including means for feeding a length of material, a slidably mounted member, a cutting die secured thereto, a lever having one end engaged with said member to impart sliding movement thereto, means for operating said lever, a die carrier rotatably supported by said member, a cutting die secured to said carrier, and means for rotating said carrier.

7. A machine for working upon movable lengths of material and including means for feeding a length of material, a cutter frame, a member slidably mounted in said frame, a cutting die secured to said member, a lever pivotally mounted on said frame and projecting therethrough to engage said member to impart sliding movement thereto, means for operating said lever, a die carrier rotatably mounted on said member, a cutting die secured to said carrier, and means for rotating said carrier.

8. A machine for working upon movable lengths of material and including means for feeding a length of material, a cutter frame, a member slidably mounted in said frame, means for imparting sliding movement to said member, a die carrier rotatably mounted on said member and having a toothed surface, a die secured to said carrier, a rack projecting through an opening in said frame and engaged with said toothed surface, and means for operating said rack.

9. A machine for working upon movable lengths of material and including means for feeding a length of material, a cutter frame, a cutter head slidably mounted in said frame, a cutting die secured to said head, a die carrier rotatably mounted on said head and having a toothed surface, a cutting die secured to said head, a lever projecting through said frame and engaged with said head, a rack projecting through said frame and engaging the teeth of said toothed surface, and a cam member rotatably mounted adjacent to said frame and having a cam to engage said lever and a cam to engage said rack.

10. A machine for working upon movable lengths of material and including means for feeding a length of material, a slidably mounted member having an enlarged end forming a shoulder, a die secured to said member, a die carrier rotatably mounted on said enlarged end, a ring secured to said carrier in contact with said shoulder to hold the carrier rotatably in position, a die secured to said carrier, means for rotating said carrier, and means for operating said member.

11. A machine for working upon movable lengths of material and including means for feeding a length of material, a slidably mounted member having an enlarged end forming a shoulder, a die secured to said member, a die carrier rotatably mounted on said enlarged end, a ring secured to said carrier in contact with said shoulder, means for operating said member, means for operating said die carrier, and means for effecting periodic rest for said member and carrier operating means.

12. A machine for working upon movable lengths of material and including means for feeding a length of material, a slidably mounted member, a die secured thereto, a rotatably mounted carrier on said member, a die secured to said carrier, means for operating said member, means for operating said carrier, and means for effectng periodic rest for said member and carrier operating means.

13. A machine for working upon movable lengths of material and including means for feeding a length of material, a slidably mounted cutter head, a die secured thereto, a die carrier rotatably mounted on said head, a die secured to said carrier, a single member for operating said head and said carrier, and means for effecting periodic rest for said member.

14. A machine for working upon movable lengths of material and including cutters mounted to move with said material, a single member for effecting said movement and also cutting action of said cutters, a bar having a groove along which said material is moved, a trip located in said groove, means for actuating said member, and a connection between said trip and said member actuating means for control of the operation of the latter by said trip.

15. A machine for working upon movable lengths of material and including cutters mounted to move with said material, a single member for effecting said movement and also for effecting cutting action of said cutters, a bar having a groove along which said material is moved, a trip located in said groove, means for actuating said member and including means for effecting periodic rest thereof, and an operative connection between said trip and said actuating means.

16. A machine for working upon movable lengths of material and including a trough to receive a length of material that is moved into said trough, a cutter to sever said material, a member for controlling operation of said cutter, a trip projecting into said trough, and a connection between said member and said trip and adjustably secured to one of said parts for operation of said member.

17. A machine for working upon movable lengths of material and including a trough to receive a length of material that is moved into said trough, a cutter to sever said material, a member for controlling operation of said cutter, a trip projecting into said trough, and a connection adjustably secured to said trip and extending to said member for operation of the latter.

18. A machine for working upon movable lengths of material and including a trough to receive a length of material that is moved into said trough, a cutter to sever said material, a member for controlling operation of said cutter, a trip projecting into said trough, a guide upon which said trip is slidably mounted, and a connection between said trip and said member for operation of the latter.

19. A machine for working upon movable lengths of material and including a trough to receive a length of material that is moved into said trough, a cutter to sever said material, a member for controlling operation of said cutter, a trip projecting into said trough, a block to which said trip is attached, a supporting bar slidably mounting said block, and a connection adjustably attached to said block and extending to and secured to said member for operating the latter.

20. A machine for working upon movable lengths of material and including a rotatably mounted trough to receive a length of material that is moved into said trough, a cutter to sever said material, and an operative connection between said trough and an operative part of the machine to periodically rotate said trough to discharge a wire therefrom.

21. A machine for working upon movable lengths of material and including a rotatably mounted trough to receive a length of material that is moved into said trough, a cutter to sever said material, an operative connection between said trough and an operative part of the machine to periodically rotate said trough to discharge material therefrom, and means for feeding material to said cutter.

22. A machine for working upon movable lengths of material and including a rotatably mounted trough held against lengthwise movement and positioned to receive a length of material that is moved into said trough, a cutter mounted on a sliding support to sever said material, and a connection between said rotating cutter and trough to rotate the latter to discharge material therefrom.

23. A machine for working upon movable lengths of material and including a cutter rotatably mounted on a sliding supporting member, a trough shaped member spaced from said sliding support and adapted to receive a length of material from said cutter, a bridge spanning the gaps between said trough shaped member and said sliding support and mounted on said sliding supporting member and said trough shaped member and movable independently of one of said members, and means for feeding material to said cutter.

24. A machine for working upon movable lengths of material and including a cutter rotatably mounted on a sliding support, a trough spaced from said sliding support and adapted to receive a length of material from said cutter, a bridge spanning the gap between said trough and said sliding support and loosely connected with the latter to slide independently thereof, said bridge being adapted to guide a length of material to said trough, and means for feeding material to said cutter.

25. A machine for working upon movable lengths of material and including a cutter rotatably mounted on a sliding support, a trough rotatably mounted in spaced relation with respect to said sliding support, a bridge spanning the gap between said sliding support to guide material to said trough, a connection between said rotating cutter and trough for rotation of the latter, and means for feeding material to said cutter.

26. A machine for working upon movable lengths of material and including a cutter, a cam shaft, a cam on said shaft to impart sliding and cutting movement to said cutter, a trip positioned for engagement by material moving from said cutter, a resetting cam on said shaft operatively connected with said trip, and a clutch on said shaft connected for operation by said resetting cam.

27. A machine for working upon movable lengths of material and including a cutter, a cam shaft having a cam operatively connected with said cutter, a trip having a sliding movement in the path of material moving from said cutter, a clutch on said cam shaft, a clutch operating member operatively connected with said trip, and means for completing the movement of said member after initial operation thereof by said trip.

28. A machine for working upon movable lengths of material and including a cutter, a cam shaft having a cam operatively connected with said cutter, a trip having a sliding movement in the path of material moving from said cutter, a clutch on said cam shaft, a clutch operating member operatively connected with said trip, means for completing the movement of said member after initial operation thereof by said trip, and means for resetting said member.

29. A machine for working upon movable lengths of material and including a cutter, a cam shaft having a cam operatively connected with said cutter, a trip having a sliding movement in the path of material moving from said cutter, a clutch on said cam shaft, a stop lever for said clutch, a clutch operating member, a link connecting said stop lever and clutch operating member, and a spring exerting force upon said stop lever and clutch operating member to move them toward each other.

30. A machine for working upon movable lengths of material and including a cutter, a trough to receive material moving from said cutter, means for rotating the trough, rotatably mounted jaws to receive said material, a treadle connected with said jaws to regulate their downward movement in the upward movement of the treadle, and means for holding the treadle in its lowermost position.

31. A machine for working upon movable lengths of material and including a cutter, a trough to receive material moving from said cutter, means for rotating the trough to discharge a wire therefrom, releasing jaws positioned to receive said wire and rotatably mounted, a treadle shaft having a treadle, and a connection between said shaft and jaws for operation of the latter.

32. A machine for working upon movable lengths of material and including a cutter, a trough to receive material moving from said cutter, means for rotating the trough to discharge a wire therefrom, releasing jaws positioned to receive said material and rotatably mounted, a treadle shaft having treadles secured thereto at different points thereon, and a connection between said jaws and shaft for operation of the former.

33. A machine for working upon movable lengths of material and including means for feeding a length of material, a slidably mounted cutter head, a die secured thereto, a die carrier rotatably mounted on said head, a die secured to said carrier, and a single member for operating said head and said carrier.

34. A machine for working upon lengths of material including a cutter, a cam shaft, a cam on said shaft to impart operative movement to said cutter, a trip positioned for engagement by material moving from said cutter, a resetting cam on said shaft operatively connected with said trip, and a clutch on said shaft connected for operation by said resetting cam.

35. A machine for working upon lengths of material and including a cutter, means for imparting sliding and connecting movement to said cutter, a trip positioned for engagement by material moving from said cutter, a resetting member operatively connected with said trip, and a clutch on said shaft connected for operation by said resetting member.

GEORGE F. MATTESON.